United States Patent
Siphuma et al.

(10) Patent No.: US 10,711,127 B2
(45) Date of Patent: Jul. 14, 2020

(54) CHLORINE-CONTAINING POLYMER COMPOSITION COMPRISING A CHLORINE-CONTAINING POLYMER AND A WAX COMPRISING A FRACTION CONSISTING OF OXIDIZED HYDROCARBONS AND A FRACTION CONSISTING OF NON-OXIDIZED HYDROCARBONS, METHOD OF PROCESSING THE POLYMER COMPOSITION AND THE USE OF THE WAX AS EXTERNAL LUBRICANT DURING THE POLYMER PROCESSING

(71) Applicant: Sasol South Africa (Pty) Ltd., Rosebank (ZA)

(72) Inventors: Lufuno Siphuma, Vanderbijlpark (ZA); Vernon Jansen Van Rensburg, Vanderbijlpark (ZA)

(73) Assignee: Sasol South Africa (Pty) Ltd., Rosebank (ZA)

( * ) Notice: Subject to any disclaimer, the term of this patent is extended or adjusted under 35 U.S.C. 154(b) by 0 days.

(21) Appl. No.: 16/317,711

(22) PCT Filed: Jul. 20, 2017

(86) PCT No.: PCT/US2017/043022
§ 371 (c)(1),
(2) Date: Jan. 14, 2019

(87) PCT Pub. No.: WO2018/017804
PCT Pub. Date: Jan. 25, 2018

(65) Prior Publication Data
US 2019/0233631 A1    Aug. 1, 2019

Related U.S. Application Data

(60) Provisional application No. 62/364,436, filed on Jul. 20, 2016.

(51) Int. Cl.
*C08L 27/06*    (2006.01)
*C08L 91/06*    (2006.01)
*C08L 15/02*    (2006.01)

(52) U.S. Cl.
CPC ............... *C08L 27/06* (2013.01); *C08L 15/02* (2013.01); *C08L 91/06* (2013.01); *C08L 2203/18* (2013.01); *C08L 2205/025* (2013.01); *C08L 2205/03* (2013.01)

(58) Field of Classification Search
CPC .................................. C08L 27/06; C08L 91/06
See application file for complete search history.

(56) References Cited

U.S. PATENT DOCUMENTS

| | | |
|---|---|---|
| 3,640,828 A | 2/1972 | Brotz et al. |
| 4,203,880 A | 5/1980 | Stoloff et al. |
| 4,218,353 A | 8/1980 | Kim |
| 4,246,150 A | 1/1981 | Bower |
| 5,426,144 A | 6/1995 | Lindner et al. |
| 2004/0039119 A1 | 2/2004 | Berard et al. |
| 2006/0111495 A1 | 5/2006 | Tabla et al. |
| 2008/0021135 A1 | 1/2008 | Garft et al. |
| 2008/0099730 A1 | 5/2008 | Sim |
| 2015/0322236 A1 | 11/2015 | Csihony et al. |

FOREIGN PATENT DOCUMENTS

| | | |
|---|---|---|
| EP | 0808851 | 11/1997 |
| WO | 2008/055091 | 5/2008 |
| WO | 2010/126813 | 11/2010 |
| WO | 2013/120792 | 8/2018 |

OTHER PUBLICATIONS

BASF: "Hard", Mar. 1, 1991, pp. 1-7, retrieved from Internet: URL: http://www2.basf.us/additives/pdfs/Luwax_OA2.pdf.
Sasol: Product Information Sheet: Sasolwax H1 Fischer-Tropsch Hard Wax in Hot Melt Adhesives, Jun. 1, 2016, pp. 1-2, retrieved from the Internet: URL: http://www.sasolwax.com/fileadmin/sasolwax/Sasolwax_H1_in_HMA.pdf.

*Primary Examiner* — Wenwen Cai
(74) *Attorney, Agent, or Firm* — Bushman Werner, P.C.

(57) ABSTRACT

The present invention encompasses chlorine-containing polymer compositions having a fraction consisting of oxidized hydrocarbons and a fraction consisting of non-oxidized hydrocarbons. Both fractions have an average number of carbon atoms per molecule between 40 and 100 carbon atoms and an amount of molecules in which the carbon chain is linear of more than 75 wt. %.

18 Claims, No Drawings

CHLORINE-CONTAINING POLYMER COMPOSITION COMPRISING A CHLORINE-CONTAINING POLYMER AND A WAX COMPRISING A FRACTION CONSISTING OF OXIDIZED HYDROCARBONS AND A FRACTION CONSISTING OF NON-OXIDIZED HYDROCARBONS, METHOD OF PROCESSING THE POLYMER COMPOSITION AND THE USE OF THE WAX AS EXTERNAL LUBRICANT DURING THE POLYMER PROCESSING

This application is a national phase application of PCT/US2017/043022 filed Jul. 20, 2017 which claims priority to U.S. Application No. 62/364,436, filed Jul. 20, 2016, the disclosures of which are incorporated herein by reference for all purposes.

The invention relates to a chlorine-containing polymer composition comprising a chlorine-containing polymer and a wax comprising a fraction consisting of oxidized hydrocarbons and a fraction consisting of non-oxidized hydrocarbons, wherein the polymer composition has improved processing properties. The wax fractions contained in the polymer composition are characterized by their acid value, congealing point, average number of carbon atoms per molecule and chemical structure.

DESCRIPTION OF THE PRIOR ART AND OBJECT OF THE INVENTION

Chlorine-containing polymers include polymers of vinyl chloride, vinyl resins containing vinyl chloride as monomer units in their backbone, copolymers comprising vinyl chloride, post chlorinated polymers, polymers of vinylidene chloride, polymers of vinyl chloroacetate and dichlorodivinyl ether, chlorinated polymers of vinyl acetate, chlorinated polymeric esters, polymers of chlorinated styrenes, chlorinated gum, chlorinated polymers of ethylene, grafted polymers of polyvinylchloride, combinations thereof and mixtures of these polymers with other thermoplastic and/or elastomeric polymers.

The most widely used chlorine-containing polymer is polyvinylchloride (PVC). PVC is a thermoplastic polymer used for a wide variety of applications of which some well-known applications are rigid tubes, pipes, window and door frames, floor coverings and cable coatings.

PVC can be hard and brittle and is often difficult to process with standard manufacturing equipment such as extruders, injection molders but also with other equipment used to process PVC or PVC compounds, such as prillers, flakers and pastillators. Additionally many manufacturing processes apply shear forces, thereby producing frictional heat and potentially thermal degradation.

Melting PVC results in a non-homogeneous melt of fused powder with different sized particles, classified in micro-domain particles (10-100 nm), primary particles (1-5 μm) and final grain (100-150 μm). During the processing of the PVC this particulate structure needs to be broken and homogenized. This requires long processing times as well as high temperatures and bears the risk of causing thermal degradation.

For these reasons it is known in the art to use lubricants as extrusion aids to facilitate the processing of plastics based on PVC.

Lubricants are materials that reduce the melt viscosity and control the frictional heat as well as the metal release from the walls of the machinery during the processing of the PVC. Such lubricants may be internal or external. External and internal lubricants can also be mixed to provide both effects.

Internal lubricants are partially compatible with PVC and have no external effects at normal levels of smaller than 2.5 phr (weight parts per hundred parts based on the rubber/polymer) in the mixture. They shorten the fusion times of the molten PVC by increasing the molecular diffusion between the grains, but play no role in the processing after the fusion. As internal lubricants, polar molecules such as fatty acids, fatty acid esters or metal esters of fatty acids have commonly been used. They lower melt viscosity, reduce internal friction and promote fusion. Internal lubricants are widely used in PVC-applications in which a high degree of fusion is required, such as e.g. bottles and clear sheets. If internal lubricants are used in higher amounts they may become incompatible with the PVC and start to act as external lubricants.

External lubricants are incompatible with the PVC at normal levels of 0.1-1.5 phr and thus migrate to the surface of the PVC mass in a fused state to reduce the friction of the PVC particles on the metal and melt interface. External lubricants need to have a suitable melting point or melting range to assure a good fusion control. They reduce the apparent viscosity and the slip between melt and processing machinery. That results in reduced screw torque and power consumption. Therefore the viscosity of the external lubricant and the resulting PVC composition plays an important role. The external lubricants are normally non-polar molecules, such as alkanes, and are usually paraffin waxes, mineral oils or polyethylene. They are used primarily for processing of rigid PVC in applications where transparency is not a critical factor. External lubricants are prevailingly waxes, with the most conventional being paraffin waxes, microcrystalline waxes or polyethylene waxes.

Waxes in general are mostly defined as chemical compositions, which have a drop melting point above 40° C., are polishable under slight pressure, are kneadable or hard to brittle and transparent to opaque at 20° C., melt above 40° C. without decomposition, and typically melt between 50 and 90° C. with exceptional cases up to 200° C., form pastes or gels and are poor conductors of heat and electricity.

Waxes can be classified according to various criteria such as e.g. their origin. Here, waxes can be divided into two main groups: natural and synthetic waxes. Natural waxes can further be divided into fossil waxes (e.g. petroleum waxes) and nonfossil waxes (e.g. animal and vegetable waxes). Petroleum waxes are divided into macrocrystalline waxes (paraffin waxes) and microcrystalline waxes (micro-waxes). Synthetic waxes can be divided into partially synthetic waxes (e.g. amide waxes) and fully synthetic waxes (e.g. polyolefin- and Fischer-Tropsch waxes).

Paraffin waxes originate from petroleum sources. They are clear, odor free and can be refined for food contact. They contain a range of (primarily) n-alkanes and iso-alkanes as well as some cyclo-alkanes. Raw or crude paraffin waxes (slack waxes) have a great number of short-chained alkanes ("oils"), which are removed when further refined. Different distributions and qualities of paraffin waxes can be obtained. Refining may include deoiling, distillation and hydrotreating.

Synthetic Fischer-Tropsch (FT) waxes or hydrocarbons originating from the catalyzed Fischer-Tropsch synthesis of syngas (CO and $H_2$) to alkanes contain predominantly n-alkanes, a low number of iso-alkanes and basically no cyclo-alkanes or impurities like e.g. sulfur or nitrogen. In return the number of olefins may be higher and different to petroleum based waxes. Therefore there are some major differences between petroleum based paraffin waxes and Fischer-Tropsch waxes which result in deviating properties like e.g. crystallisation and rheological behaviour. Another source for the waxes/hydrocarbons are products obtained from the oligomerization/polymerization of olefinic monomers, possibly followed by hydrotreating.

Additionally all hydrocarbon waxes can be oxidized by different methods, the easiest one being the process of reacting waxes with oxygen or air, preferably in presence of a catalyst. The oxidation introduces different functionalities (hydroxyl, carbonyl etc.) without changing the branching or carbon chain length of the molecules. A typical ratio of functionalities formed during oxidation is 1.5 parts ketones to 1 part acids to 1 part esters to 1 part hydroxyls. Formed internal esters (e.g. lactones) can be opened by saponifaction with metal soaps, which also saponifies the other carboxyl sites in the oxidized wax molecule. The degree of oxidation reflected for example by the acid number of the oxidized wax can be adjusted by the oxidation procedure. Therefore the fraction of the wax that consists of oxidized hydrocarbons can be adjusted.

In general polyethylene (PE) waxes have higher molecular weights than paraffin or Fischer-Tropsch waxes resulting in higher viscosities and a different chemical structure. Due to the production of polyethylene waxes they have a larger amount of molecules with two carbon atoms difference per molecule, for example. The same is true for most of the oxidized derivatives thereof. Polyethylene waxes also have a different pattern of branches, up to hexyl-branches in the side chains.

U.S. Pat. No. 3,640,828 mentions lubricant compositions for polyvinylchloride including synthetic ester waxes based on commercial montanic acid, hydrocarbon waxes such as petroleum paraffins, synthetic paraffins and polyethylene waxes or the oxidation products thereof. Improved properties regarding the PVC output rates are described if a composition consisting of 20-80 wt.-% of a metal soap and/or wax containing a metal soap and 80-20 wt.-% of a hydrocarbon wax are used. Metal soaps according to U.S. Pat. No. 3,640,828 are salts of alkaline earth metals, zinc, cadmium, tin or lead with fatty or waxy acids, e.g. calcium stearate, calcium montanate etc. The use of a combination of a synthetic ester wax containing a metal soap (Hoechst-Wachs® OP) and a FT-wax having a melting point of 101-103° C. in the ratio of 0.8:1.2 showed the highest output of PVC.

WO 2008/055091 A2 describes the incorporation of an oxidized, low viscosity byproduct wax component which reduces the melt viscosity, allowing higher levels of a metal stearate to be incorporated and thereby producing an improved low viscosity lubricant composition. Particularly, WO 2008/055091 A2 provides a multi-component lubricant composition comprising at least one oxidized, low viscosity wax and at least one metal salt, which metal salt comprises at least about 30% by weight of the lubricant composition. The oxidized, low viscosity byproduct wax has a melt viscosity of less than or equal to about 100 centipoise at 140° C., an acid number of from about 7 to about 24 mg KOH/g. Together with the metal salt component, the lubricant composition has a viscosity of less than about 450 cps at 140° C. The byproduct waxes derive from the polymerization of high density polyethylene and are called e.g. A-C® 629 from Honeywell. Fischer-Tropsch waxes are mentioned as possible further wax component, but not as oxidized wax component.

WO 2010/126813 A2 related to metal salts of oxidized molecular byproduct polyethylene as lubricant for PVC.

WO 2013/120792 A1 describes PVC compositions of high impact strength comprising a combination of a FT-wax with oxidized polyethylene wax. Aim of the disclosure is to find suitable and effective stabilizers for PVC replacing existing ones such as lead, barium, tin or cadmium compounds, which have become critical due to ecological reasons. It has been found that the combination of FT-wax (such as Sasolwax H1), which normally lowers the impact strength by increasing the fusion time due to the lower viscosity, and oxidized PE-wax (e.g. Luwax OA2 from BASF), which normally increases the impact strength but decreases the output, results in an improved PVC-compositions with a higher output and impact strength.

EP 0 808 851 A2 teaches a combination of a FT-wax and an oxidized PE wax as suitable lubricant for chlorinated PVC-products. EP 0 808 851 A2 discloses the use of e.g. 0.75 parts of AC 629-A (oxidized PE-wax) and 0.5 parts FT-wax in a resulting chlorinated PVC composition having excellent physical and chemical resistance as well as processing properties.

All references cited above are incorporated herein by reference for all purposes.

In summary the purpose of an external PVC lubricant is to ease processing in particular with respect to extruding or melting or both and this at economical costs. It has been found that highly effective lubricant compositions generally consist of a combination of at least one wax component, such as a hydrocarbon wax (e.g. alpha olefin waxes and polyethylene waxes) and at least one fatty acid component or at least one metal salt of a fatty acid. However, it has also been found that known lubricant compositions blending waxes and fatty acids or metal salts of fatty acids, undesirably increase the viscosity of the lubricant composition, rendering the lubricant difficult to process and finish on manufacturing equipment. Accordingly, a lower viscosity alternative is desired.

To evaluate the impact of external lubricants on the polymer processing, the fusion time and fusion torque according to ASTM D 2538 can be determined. Standard paraffin waxes have a fusion time of around 40 s and a fusion torque of 50 to 60 Nm at a concentration of 0.8 phr in the PVC. Polyethylene waxes show a fusion time of 60 to 80 s and a fusion torque of around 40 Nm at the same concentration. Fischer-Tropsch waxes provide a fusion time of 80 to 100 s and a fusion torque of 30 to 40 Nm. All these values are only relative to the same standard.

It is desirable to achieve a good compromise between fusion time and fusion torque or external and internal lubrication, respectively. A lower fusion torque coming from external lubrication results in less energy consumption and surging, but due to the reduction of frictional heat also in a longer fusion time and gelation delay. If the fusion time becomes too long, no proper fusion of the PVC granules can be achieved and the mechanical properties of the final product (e.g. impact and tensile strength) will suffer. Then more internal lubrication is needed.

It is an objective of the present invention to provide an improved chlorine-containing polymer composition comprising an external lubricant, which combines the above mentioned advantages in viscosity, fusion time and fusion torque as well as mechanical properties of the final product. It should also be able to replace other lubricant components thereby reducing the overall concentration needed and increasing the efficiency of the lubricant composition, by adjusting the relation between fusion time and fusion torque.

SUMMARY OF THE INVENTION

It was surprisingly found that a chlorine-containing polymer composition comprising
a chlorine-containing polymer; and
a wax comprising
   a fraction consisting of oxidized hydrocarbons; and
   a fraction consisting of non-oxidized hydrocarbons, wherein both fractions have
      an average number of carbon atoms (number average) per molecule between 40 to 100 carbon atoms; and
      an amount of molecules in which the carbon chain is linear of more than 75 wt. %
shows improved processing properties by increasing the lubrication of the composition and by adjusting the relation between fusion time and fusion torque.

The chlorine-containing polymer preferably is polyvinylchloride.

Hydrocarbons according to the invention are molecules consisting exclusively of carbon and hydrogen, such as alkanes. Oxidized hydrocarbons are hydrocarbon molecules reacted with oxygen or air, preferably in presence of a catalyst, so that each molecule is modified with at least one or more moieties selected from the group consisting of hydroxyl, carbonyl, carboxylate or lactone.

In a preferred embodiment the fraction consisting of oxidized hydrocarbons has an acid value according to ASTM 1386/7 of 50 to 70 mg KOH/g, more preferably 52 to 64 mg KOH/g and most preferably 56 to 60 mg KOH/g.

The average number of carbon atoms (number average) per molecule of the fraction consisting of oxidized hydrocarbons and/or the fraction consisting of non-oxidized hydrocarbons preferably is between 45 to 80 carbon atoms, more preferably between 50 to 60 carbon atoms.

The average molecular weight of the fraction consisting of oxidized hydrocarbons and/or the fraction consisting of non-oxidized hydrocarbons preferably is below 1000 g/mol, more preferably in the range of 650 to 1000 g/mol and most preferably between 700 to 900 g/mol.

In a further preferred embodiment both fractions comprised in the chlorine-containing polymer composition have a distribution of molecules in the range of 30 to 80 carbon atoms, wherein the number of molecules is either increasing or decreasing for at least two consecutive numbers of additional carbon atoms per molecule.

Further preferred is an increase or decrease in the number of molecules per number of carbon atoms in the range of 30 to 80 carbon atoms, for a row of at least three, preferably five consecutive numbers of carbon atoms.

That also means that the number of carbon atoms per molecule is regularly distributed without a dominance of even or uneven numbers of carbon atoms or that the number of molecules with even numbered carbon atoms and the number of molecules with an odd number of carbon atoms is equitable.

The number of molecules per number of carbon atoms according to the invention means the total number of molecules of oxidized and non-oxidized hydrocarbons including unsaturated and saturated hydrocarbons for each number of carbon atoms including all carbon atoms along the linear chain backbone and those forming part of a branch on the backbone. However, cyclic molecules except lactone moieties are excluded from this calculation.

In a further preferred embodiment the fraction consisting of oxidized hydrocarbons and/or the fraction consisting of non-oxidized hydrocarbons comprised in the chlorine-containing polymer composition have more than 30 wt.-%, preferably more than 45 wt.-% and most preferably more than 48 wt.-% of molecules with an odd number of carbon atoms.

In a further preferred embodiment the fraction consisting of oxidized hydrocarbons and/or the fraction consisting of non-oxidized hydrocarbons are Fischer-Tropsch waxes.

Fischer-Tropsch waxes as used in the composition according to the invention are defined as waxes originating from the Cobalt- or Iron-catalyzed Fischer-Tropsch synthesis of syngas (CO and $H_2$) to alkanes. The crude product of this synthesis is separated into liquid and different solid fractions by distillation. The waxes contain predominantly n-alkanes, a low number of iso-alkanes and basically no cyclo-alkanes or impurities like e.g. sulfur or nitrogen. As Fischer-Tropsch waxes are consisting of methyl-monomer-building blocks, they have a molecular pattern dominated by an evenly increasing or decreasing number of molecules at each carbon atom chain length. This can be seen in GC-analyses of the wax components.

The average molecular weight can be calculated from a gas chromatogram of the waxes obtained according to EWF Method 001/03 of the European Wax Federation or determined by gel permeation chromatography or $^{13}$C-NMR.

It was surprisingly found that the acid value of the fraction consisting of oxidized hydrocarbons, the average number of carbon atoms (number average) per molecule, the distribution of the number of carbon atoms per molecule and the type and amount of branching (reflected by n-alkane content and structure of branches) are critical for achieving superior performance of the chlorine-containing polymer composition during processing.

The fraction consisting of oxidized hydrocarbons and/or the fraction consisting of non-oxidized hydrocarbons preferably has an amount of molecules in which the chain is linear of more than 80 wt.-%, more preferably of more than 90 wt.-%.

The branched molecules of the fraction consisting of oxidized hydrocarbons and/or the fraction consisting of non-oxidized hydrocarbons preferably contain more than 10 wt.-%, more preferably more than 25 wt.-% methyl branches and/or methyl as monomer building block and/or no quaternary carbon atoms.

The n-alkane content and average number of carbon atoms (number average) per molecule can be determined by gas chromatography (EWF Method 001/03 of the European Wax Federation). The type of branching may be determined by $^{13}$C-nuclear magnetic resonance spectroscopy.

A low viscosity is also important for the processing of the PVC. Therefore the fraction consisting of oxidized hydrocarbons and/or the fraction consisting of non-oxidized hydrocarbons have in a preferred embodiment a viscosity according to ASTM D445-11a at 140° C. below 20 cps.

In a further preferred embodiment the chlorine-containing polymer composition comprises a wax comprising the fraction consisting of oxidized hydrocarbons and the fraction consisting of non-oxidized hydrocarbons, wherein the wax is defined by an acid value according to ASTM 1386/7 of 2 to 14 mg KOH/g, preferably 3 to 8 mg KOH/g and more preferably of 4 to 7 mg KOH/g.

The congealing point according to ASTM D 938 of the wax preferably is between 90 to 110° C., more preferably between 95 to 105° C. and most preferably between 98 to 102° C.

In a preferred embodiment the fraction consisting of oxidized hydrocarbons and the fraction consisting of non-oxidized hydrocarbons together are present in a concentration of 0.1 to 1 phr, more preferably 0.2 to 0.9 phr and most preferably 0.6 to 0.85 phr in the chlorine-containing polymer composition.

In a further preferred embodiment the chlorine-containing polymer composition comprises 2 to 15 wt.-% of the fraction consisting of oxidized hydrocarbons, preferably 5 to 12 wt.-% and more preferably 10 wt.-%, relative to the sum of the fraction consisting of oxidized hydrocarbons and the fraction consisting of non-oxidized hydrocarbons present in the composition.

According to one embodiment of the present invention the fraction consisting of oxidized hydrocarbons and/or the fraction consisting of non-oxidized hydrocarbons in the chlorine-containing polymer composition consist of particles, wherein 90% of the particles have a particles size according to ASTM D185 between 106 μm and 2000 μm.

Furthermore the chlorine-containing polymer composition may comprise 0.1 to 5 phr other additives selected from the group of calcium stearate, polyethylene wax, oxidized polyethylene wax, titanium dioxide, tin, calcium/zinc, lead or organic based stabilizer, preferably tin or lead stabilizers or combinations thereof.

The chlorine-containing polymer composition preferably comprises below 2 phr of all lubricants in total.

The invention also includes a method of processing a chlorine-containing polymer composition by extrusion, wherein the chlorine-containing polymer composition comprises at least the above defined fraction consisting of oxidized hydrocarbons and the fraction consisting of non-oxidized hydrocarbons Furthermore the use of 0.1 to 2.5 phr of a fraction consisting of oxidized hydrocarbons and a fraction consisting of non-oxidized hydrocarbons as defined above in a chlorine-containing polymer composition as external lubricant is claimed, preferably to obtain a ratio of fusion time to fusion torque according to ASTM D 2538 between 2.0 to 4.0, more preferably between 2.5 and 3.5 and/or to increase the PVC output in kg/h at the same concentration of external lubricant and/or to decrease the concentration of external lubricant at the same PVC output in kg/h and/or both.

EXAMPLES

Different waxes and wax mixtures (table 1+2) were tested in a Brabender Plasticorder Lab station to evaluate the PVC processing properties. All three heating zones 1, 2, 3 were set at 180° C. The mixer heat speed was 70 rpm and the pressure of the pressure ram was 2 bar.

TABLE 1

Properties of different waxes used in PVC (*determined by GPC, #determined and calculated from GC with EWF Method 001/03, ˣdetermined by $^{13}$C-NMR)

| | Oxidized FT-wax Sasolwax A28 | Paraffin wax Rheolube RL165 | Oxidized PE-wax BASF Luwax OA2 | Oxidized PE-wax Honeywell AC629 | FT-wax Sasolwax H1 |
|---|---|---|---|---|---|
| Congealing Point [° C.] | 95 | 68 | 98 | 101 | 97 |
| Pen at 25° C. [1/10 mm] | 3.8 | 15 | 2 | 6 | 1 |
| Acid value [mg KOH/g] | 29 | 0.92 | 31 | 18 | <0.1 |
| Average carbon chain length [carbon atoms] | 55 | — | | | 55 |
| Amount of fraction of oxidized hydrocarbons | 48.0% | | | 21.4% | |
| Average molecular weight [g/mol] | 900* | — | 2800 | >1000 | 880* 733# |
| | 866ˣ | | 1910ˣ | 1808ˣ | |
| Amount of branchingˣ [mol %] | 0.68 | | 0.98 | 1.35 | |
| Type of Branching | Methyl | — | Aliphatic (ethyl to hexyl) | Aliphatic (ethyl to hexyl) | Methyl |
| Further molecular characteristicsˣ | No quaternary carbon atoms | | Quaternary carbon atoms with two ethyl or one ethyl and one butyl group on the same carbon atoms | Quaternary carbon atoms with two ethyl or one ethyl and one butyl group on the same carbon atoms | No quaternary carbon atoms |
| Monomer building block | Methyl | — | Ethyl | Ethyl | Methyl |
| Viscosity @140° C. [cps] | 15.5 | 2.25 | 149 | 206 | 9.6 |

TABLE 2

Properties of different waxes and wax mixtures used in PVC

|  | Oxidized FT-wax Inv. A | Oxidized FT-wax Inv. B | Oxidized FT-wax Inv. C | Comp. A 87.5% H1 + 12.5% OA2 | Comp. B 87.5% H1 + 12.5% AC629 |
|---|---|---|---|---|---|
| Congealing Point [° C.] | 100 | 100 | 102 | 100 | 99 |
| Pen at 25° C. [1/10 mm] | 1 | 1 | 1 | 1 | 1 |
| Acid value [mg KOH/g] | 14 | 2.6 | 5.6 | 2.23 | 3.14 |
| Amount of fraction of oxidized hydrocarbons | 24% | 4.8% | 9.6% |  | 2.7% |
| Average carbon chain length [carbon atoms] | 55 | 55 | 55 |  |  |
| Average molecular weight [g/mol] | 800-1000 | 800-1000 | 800-1000 |  |  |
| Viscosity @140° C. [cps] | 14.8 | 13.4 | 13.6 | 13 | 13.2 |

The gel permeation chromatography (GPC) may result in higher molecular weight data as longer molecules can be determined compared to gas chromatography-methods (GC).

The PVC formulation used for the tests was as follows:

TABLE 3

PVC-composition used for the Brabender tests

| Materials | phr |
|---|---|
| PVC | 100 |
| Tin stabilizer | 0.4 |
| CaCO$_3$ | 4 |
| TiO$_2$ | 0.26 |
| Calcium stearate | 0.4 |
| Wax | 0.8 |

The materials were pre-mixed in a Henschel high speed mixer while heating to 120° C. Once cooled to ambient temperature, a sample was taken for fusion time/torque measurement on the Brabender according to ASTM D 2538 (see results in table 4).

TABLE 4

Fusion times and fusion torques determined with different waxes in the PVC composition

| Wax in PVC Composition | Fusion Time [s] | Fusion Torque [Nm] |
|---|---|---|
| Sasolwax A28 | 42.5 | 51.0 |
| Rheolube RL165 | 81 | 48.0 |
| Sasolwax H1 | 101 | 41.7 |
| Inv. A | 109 | 41.1 |
| Inv. B | 114.5 | 39.1 |
| Inv. C | 125 | 38.6 |
| Comp. A | 203 | 35.8 |
| Comp. B | 177 | 36.8 |

The inventive poly vinyl-compositions show lower fusion torques and reasonable fusion times which results in a faster and improved processability thereof compared to the state of the art products.

In a further experiment PVC formulations comprising lubricants according to the table 5 have been mixed and used to produce white 1" pipes according to pressure schedule 40 of ASTM D2466 by extrusion in a parallel twin screw extruder with a motor speed of 1.700 rpm (results table 6).

TABLE 5

Different PVC-compositions for pipe production

| [phr] |  | PVC comp. 1 | PVC comp. 2 | PVC comp. 3 |
|---|---|---|---|---|
| PVC resin |  | 100 | 100 | 100 |
| Tin stabilizer |  | 0.5 | 0.5 | 0.5 |
| Wax | Inv. B | 1.0 | — | — |
|  | Inv. C | — | 0.6 | 0.85 |
|  | AC 629 | 0.12 | — | — |
| Calcium stearate |  | 0.65 | 1.0 | 0.6 |
| Process aid |  | 1.0 | — | — |
| Calcium carbonate |  | 5.0 | 5.0 | 5.0 |
| Titanium Dioxide |  | 0.5 | 0.5 | 0.5 |

TABLE 6

Data of pipe production and pipe products

|  | Pipe 1 | Pipe 2 | Pipe 3 |
|---|---|---|---|
| PVC composition | 1 | 2 | 3 |
| Output [kg/h] | 498 | 485 | 528 |

The experiments resulted in pipes with an excellent quality and appearance and allowed a significant reduction of the required amount of lubricant (from usually 1.5 phr paraffin wax to 1.12 phr wax according to the invention in pipe 1 and 0.6 phr and 0.85 phr wax in pipes 2 and 3). Furthermore the preferred wax composition C allowed pipe extrusion without any oxidized polyethylene wax as used in the prior art.

Either the output of the pipe during the extrusion process could be increased, the amount of lubricant be decreased or both, which refers to an increased efficiency of the lubricant in the PVC composition.

The invention claimed is:

1. A chlorine-containing polymer composition comprising:
   a chlorine-containing polymer; and
   a wax comprising
      a fraction consisting of oxidized hydrocarbons; and
      a fraction consisting of non-oxidized hydrocarbons, wherein both fractions are Fischer-Tropsch waxes and both fractions have
   an average number of carbon atoms (number average) per molecule between 40 to 100 carbon atoms; and
   an amount of molecules in which the carbon chain is linear of more than 75 wt.-%.

2. The chlorine-containing polymer composition according to claim 1 wherein the fraction consisting of oxidized hydrocarbons has an acid value according to ASTM 1386/7 of 50 to 70 mg KOH/g.

3. The chlorine-containing polymer composition according to claim 1, wherein the average number of carbon atoms (number average) per molecule of the fraction consisting of oxidized hydrocarbons and/or the fraction consisting of the non-oxidized hydrocarbons is between 45 to 80 carbon atoms.

4. The chlorine-containing polymer composition according to claim 1, wherein the average molecular weight of the fraction consisting of oxidized hydrocarbons and/or the fraction consisting of the non-oxidized hydrocarbons is below 1000 g/mol.

5. The chlorine-containing polymer composition according to claim 1, wherein the fraction consisting of oxidized hydrocarbons and/or the fraction consisting of the non-oxidized hydrocarbons have a distribution of molecules in the range of 30 to 80 carbon atoms.

6. The chlorine-containing polymer composition according to claim 1, wherein the fraction consisting of oxidized hydrocarbons and/or the fraction consisting of the non-oxidized hydrocarbons have more than 45 wt.-% of molecules with an odd number of carbon atoms.

7. The chlorine-containing polymer composition according to claim 1, wherein the branched molecules of the fraction consisting of oxidized hydrocarbons and/or the fraction consisting of the non-oxidized hydrocarbons have more than 10 wt.-% methyl branches and/or no quaternary carbon atoms.

8. The chlorine-containing polymer composition according to claim 1, wherein the fraction consisting of oxidized hydrocarbons and/or the fraction consisting of the non-oxidized hydrocarbons have an amount of molecules in which the carbon chain is linear of more than 80 wt.-%.

9. The chlorine-containing polymer composition according to claim 1, wherein the fraction consisting of oxidized hydrocarbons and/or the fraction consisting of the non-oxidized hydrocarbons have a viscosity according to ASTM D445-11 at 140° C. of below 20 cps.

10. The chlorine-containing polymer composition according to claim 1, wherein each molecule of the fraction consisting of oxidized hydrocarbons has one or more hydroxyl, carbonyl, carboxylate or lactone moiety.

11. The chlorine-containing polymer composition according to claim 1, wherein the composition comprises 2 to 15 wt.-% of the fraction consisting of oxidized hydrocarbons, relative to the sum of the wax comprising the fraction consisting of oxidized hydrocarbons and the fraction consisting of non-oxidized hydrocarbons present in the composition.

12. The chlorine-containing polymer composition according to claim 1, wherein the wax comprising the fraction consisting of oxidized hydrocarbons and the fraction consisting of non-oxidized hydrocarbons is defined by an acid value according to ASTM 1386/7 of 2 to 14 mg KOH/g.

13. The chlorine-containing polymer composition according to claim 1, wherein the congealing point according to ASTM D 938 of the wax comprising the fraction consisting of oxidized hydrocarbons and the fraction consisting of non-oxidized hydrocarbons is between 90 to 110° C.

14. The chlorine-containing polymer composition according to claim 1, comprising 0.1 to 1 phr of the wax comprising the fraction consisting of oxidized hydrocarbons and the fraction consisting of non-oxidized hydrocarbons together.

15. The chlorine-containing polymer composition according to claim 1, wherein the chlorine-containing polymer is polyvinylchloride.

16. The chlorine-containing polymer composition according to claim 1, comprising 0.1 to 5 phr other additives selected from the group consisting of calcium stearate, polyethylene wax, titanium dioxide, tin, calcium, zinc, lead stabilizer, organic based stabilizer, and combinations thereof.

17. A method of processing a chlorine-containing polymer composition, comprising the steps of mixing a chlorine-containing polymer with the wax comprising the fraction consisting of oxidized hydrocarbons and the fraction consisting of non-oxidized hydrocarbons as claimed in claim 1; and extruding the mixture.

18. The method according to claim 17, wherein said wax is in the amount of 0.1 to 2.5 phr.

* * * * *